United States Patent Office 3,284,990
Patented Nov. 15, 1966

3,284,990
ELECTRICAL SEPARATION OF DUST
Nils Örne, 81 Banergatan, Stockholm No, Sweden
No Drawing. Filed Nov. 7, 1963, Ser. No. 322,055
4 Claims. (Cl. 55—5)

This invention relates to an improvement in the separation of dust from industrial gases by electrostatic precipitation.

It is already known when utilizing electrostatic precipitation apparatus for the separation of dust from industrial gases, that to avoid disturbances in the form of corona effect on the precipitation-electrodes the dust deposited on the precipitation electrodes must have a sufficient electrical conductivity such that the small direct current of gas ions from the emission electrode can pass continuously through the layer of dust and reach the surface of the precipitation-electrodes.

Many dusts consist of oxides, silicates and other similar inorganic components, which in their pure state are characterized by a very high electrical resistance. When such substances are to be electrically separated from a gas-stream it has previously been found necessary to condition the gas, e.g. with water vapor or sulphuric acid, so that the dust particles are covered with an electrically conducting film.

In these known methods, the sulphuric acid is added to the gas stream either as sulphuric acid vapor or as sulphur trioxide which forms sulphuric acid with the water vapor in the gas. Experiments have shown that only a fraction of the amount of the added material affects the particles while the rest follows the gas stream and causes corrosion in ducting subsequent to the electric precipitator in the apparatus. One explanation of this could be that at the existing temperature the sulphuric acid is evaporated to a considerable degree and hence cannot condense on the particles.

This method of operation is expensive and when sulphuric acid or liquids which form acids when in contact with the dust are employed, difficult corrosion problems arise. Water vapor is effective only in large quantities, and the use of large quantities of water vapor unduly increases the volume of gases in the system and is therefore not advantageous.

It has been noted in separators for fly-ash, that the phenomenon of corona-effect even on the precipitation electrodes is most prominent when both the particles and the gas carrying the particles have a temperature between about 75° C. and about 175° C. One possible explanation of this may be that below this temperature range the particles carry a layer of moisture on their surfaces and that at temperatures considerably above this range, this condensate will have evaporated, but the particles themselves will have become conductive.

One object of this invention is to avoid the disadvantages experienced in the prior art when water, sulphuric acid, or sulfur dioxide has been added to the dust-carrying gases and to improve the operation of the electrostatic cleaning of the gases by means of an addition which does not produce problems like those heretofore encountered.

A more specific object of the invention is to improve the operation of dust separating apparatus by the addition of phosphoric acid or phosphorus containing compounds to the dust-laden gases as they enter the electrostatic precipitating apparatus.

Specifically, it has been found that addition of phosphoric acid (or compounds which form phosphoric acid) to the gas-stream has a very favorable influence on the precipitation electrode, thereby improving the separation effect without making the gas carrying the particles corrosive.

The phosphoric acid component can be added to the precipitator in a wide range of concentrations and in any of several different ways, according to the existing conditions. Particularly good results have been obtained by using the product produced burning yellow phosphorus in connection with a gas-stream containing a large surplus of oxygen, as the additive to the dust-laden gas stream from which the dust is to be separated.

As is well known, when phosphorus is burned there is a strong evolution of heat (the flame can have a temperature of 2000° C.) and phosphorus pentoxide is formed. This compound is one of the most highly hygroscopic known, and leaves the zone of combustion in vapor form at high temperature. The molecules have the composition $P_4O_{10}$. When the resulting vapor is introduced into the stream of dust-laden gases, some of this very hot vapor will condense on the dust particles in the dust-laden gas and form phosphoric acid and some will form phosphoric acid in the gas-stream, and yet another portion of the hot combustion products will form drops or particles of $P_2O_5$ which may become coated with phosphoric acid and may later be precipitated on the precipitation electrodes. In addition, some of the phosphoric acid which forms may condense on the dust particles in the gas-stream.

The combustion of the phosphorus can be varied within wide limits, by varying the relative proportions of phosphorus and air, or by varying the oxygen content of the air, or by adding varying amounts of water vapor to the air. The phosphorus can even be burned with water-vapor alone whereby any of a number of phosphoric acids may be formed, as illustrated with the following reaction formulaes:

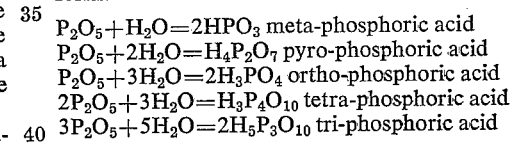

$P_2O_5 + H_2O = 2HPO_3$ meta-phosphoric acid
$P_2O_5 + 2H_2O = H_4P_2O_7$ pyro-phosphoric acid
$P_2O_5 + 3H_2O = 2H_3PO_4$ ortho-phosphoric acid
$2P_2O_5 + 3H_2O = H_3P_4O_{10}$ tetra-phosphoric acid
$3P_2O_5 + 5H_2O = 2H_5P_3O_{10}$ tri-phosphoric acid Phosphoric acid with as high concentration of $P_2O_5$ which corresponds to 96% $H_3PO_4$) boils at 200° C. and gives off a vapor which consists almost exclusively of water vapor.

The following example will more fully illustrate the practice of this invention and is to be construed as illustrative rather than as limitative thereof:

Fly-ash containing gases from an electric power plant in which low-grade coal was burned under boilers to generate steam were rid of their fly-ash by treatment in a conventional Cottrell type electrical precipitator. The gases leaving the burners were separated into a smaller gas-stream introduced in a pilot precipitator, a single-field one able to separate ashes from gas-volumes up to 2000 c.f.m. with high efficiency. The coal burned had a sulphur content of about 0.6–0.7% and ashes 16–17% and to get the precipitator in good working conditions one must add about 15 p.p.m. $SO_3$ by weight of the gas into the gas-stream.

The inventor has been able to reach the same conditions for the precipitator above by adding only 1–2 p.p.m. by weight of the gas of yellow phosphorus into the gas-stream and tests showed that all the phosphorus quantity was added to the particles. This test shows that the inventor's method brings the conditioning costs down to half of the $SO_3$-method and that the phosphorus-conditioning will not cause any corrosion problems at all.

What is claimed is:
1. In a method for the electrical separation of dust from a gas stream between emission and precipitation electrodes in order to avoid a corona-effect on the precipi- tation electrodes, the improvement which comprises coating the dust particles with an electrically conducting film containing phosphorus pentoxide in order to improve the electrical conductivity of the precipitated dust to enable a direct current of gas ions from the emission electrode to pass through the precipitated dust on the precipitation electrodes and to reach the surface of the said electrodes.

2. In a method for the electrical separation of dust from a gas stream between emission and precipitation electrodes in order to avoid a corona-effect on the precipitation electrodes, the improvement which comprises coating the dust particles with an electrically conducting film comprising a phosphoric acid formed by the combustion of yellow phosphorus adjacent to the entrance to the dust separator in order to produce phosphorus pentoxide to improve the electrical conductivity of the precipitated dust to enable a direct current of gas ions from the emission electrode to pass through the precipitated dust on the precipitation electrodes and to reach the surface of the said electrodes.

3. A method according to claim 2 wherein the phosphoric acid is added to said gas stream at a temperature higher than that of the particles to be precipitated.

4. A method according to claim 2 wherein the gas furnished for the combustion of the yellow phosphorus is also supplied with water vapor.

References Cited by the Examiner
UNITED STATES PATENTS

| | | | |
|---|---|---|---|
| 1,441,713 | 1/1923 | Prosser | 55—5 |
| 1,586,115 | 5/1926 | Pistor et al. | 55—2 X |
| 1,721,868 | 7/1929 | Mayer | 55—10 |

FOREIGN PATENTS

| | | |
|---|---|---|
| 583,176 | 12/1946 | Great Britain. |
| 626,059 | 7/1949 | Great Britain. |

ROBERT F. BURNETT, *Primary Examiner.*